(12) United States Patent
De Novi

(10) Patent No.: US 10,304,092 B2
(45) Date of Patent: May 28, 2019

(54) SYSTEM AND METHOD FOR ELECTRONIC CORRELATED SALES AND ADVERTISING

(71) Applicant: Gianluca De Novi, Cambridge, MA (US)

(72) Inventor: Gianluca De Novi, Cambridge, MA (US)

( * ) Notice: Subject to any disclaimer, the term of this patent is extended or adjusted under 35 U.S.C. 154(b) by 161 days.

(21) Appl. No.: 13/893,397

(22) Filed: May 14, 2013

(65) Prior Publication Data

US 2014/0058843 A1    Feb. 27, 2014

Related U.S. Application Data

(60) Provisional application No. 61/692,298, filed on Aug. 23, 2012.

(51) Int. Cl.
*G06Q 30/02* (2012.01)

(52) U.S. Cl.
CPC ..... *G06Q 30/0268* (2013.01); *G06Q 30/0254* (2013.01); *G06Q 30/0255* (2013.01)

(58) Field of Classification Search
USPC .................................... 705/14, 65
See application file for complete search history.

(56) References Cited

U.S. PATENT DOCUMENTS

| | | | |
|---|---|---|---|
| 7,349,884 B1 * | 3/2008 | Odom ............ | G06Q 20/042 705/40 |
| 8,228,196 B1 | 7/2012 | Thornton | |
| 2002/0165832 A1 * | 11/2002 | Kawaguchi ........ | G06Q 30/0283 705/400 |
| 2004/0024709 A1 | 2/2004 | Yu et al. | |
| 2011/0093344 A1 * | 4/2011 | Burke .............. | G06Q 20/20 705/14.65 |
| 2011/0153393 A1 | 6/2011 | Raff et al. | |
| 2011/0307342 A1 * | 12/2011 | Haji ............... | G06Q 20/209 705/24 |
| 2012/0005222 A1 * | 1/2012 | Bhagwan ......... | G06K 9/18 707/769 |

* cited by examiner

*Primary Examiner* — Marie P Brady
(74) *Attorney, Agent, or Firm* — Lambert Shortell & Connaughton; Gary E. Lambert; David J. Connaughton

(57) ABSTRACT

A system is disclosed for presenting advertisements for products and related products for a consumer based on the products being purchased.

8 Claims, 3 Drawing Sheets

| Codice Prodotto Venduto | %Slot 1 | %Slot 2 | % lot 3 | C%Slot 1 | C%Slot 2 | C% lot 3 | Totale |
|---|---|---|---|---|---|---|---|
| A | 40 | | | € 100,00 | € 60,00 | € 40,00 | € 4.100,00 |
| B | | 25 | | € 100,00 | € 60,00 | € 40,00 | € 1.640,00 |
| C | 10 | 25 | | € 100,00 | € 60,00 | € 40,00 | € 2.540,00 |
| D | | | 40 | € 100,00 | € 60,00 | € 40,00 | € 1.760,00 |
| E | 10 | 30 | | € 100,00 | € 60,00 | € 40,00 | € 2.840,00 |
| F | | 10 | | € 100,00 | € 60,00 | € 40,00 | € 740,00 |
| | | | | | | | € 13.620,00 |

SYSTEM AND METHOD FOR ELECTRONIC CORRELATED SALES AND ADVERTISING

CROSS-REFERENCE TO RELATED APPLICATIONS

This application is a non-provisional application which claims the benefit to Provisional Application No. 61/692,298 filed Aug. 23, 2012.

BACKGROUND OF THE INVENTION

Field of the Invention

The present invention relates to a system and method for electronic correlation of sales and advertising.

Description of Related Art

Advertisements are common ways to drive store traffic and increase sales. Further, in store advertisements are common to point out sales and discounted items, encouraging customers to buy the items even if they were not planning on it. Similarly, in some situations, advertisements may be displayed near one item to suggest a purchase of a complimentary item. However, all of these methods of increasing sales fail to target consumers directly based on what they purchase.

Therefore, what is needed is a system that may identify what customers are purchasing and identify complimentary, similar, or competing products to present these options to the customer, thereby stimulating sales.

SUMMARY OF THE INVENTION

In one embodiment, the present invention provides an advertisement communication system providing customized advertisements based on items being purchased by a customer. In a particular embodiment, the present invention is a communication system that may present video, text, pictures and/or audio in either an interactive or non-interactive format. The system has a point-of-sale computer with management software, a USB/PS2 bypass (or other wired/wireless connection) connected to the point-of-sale computer, a bar code reader connected through the USB/PS2 bypass to the point-of-sale computer, an electronic display connected to the bar code reader through the USB/PS2 bypass and a database of product information connected to the electronic display, for example, through a wireless router, a LAN, the internet, or the database may be locally stored on a computer memory. The product information in the database includes, for example, bar code data and data correlating products in the database. When the bar code reader scans a bar code of a first product, data identifying the first product is passed through the USB/PS2 bypass or other connection bus to the computer and also to the electronic display. In response to receiving the data identifying the first product, the electronic display retrieves from the database information relating to a second product correlated to the first product in the database. This retrieved information is then displayed by the electronic display.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive.

Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

In a preferred embodiment, the present invention is a new powerful interactive video, advertising and communication system. The system contemplated herein stimulates "pulse" or "impulse" purchases by consumers by inducing a customer to remember and buy products related to an item the consumer already intends to purchase. As such, the system results in increased revenue to an establishment using the system. The system recognizes products via the bar codes on the products. The barcodes of various products are stored in a remote and centralized database in order to collect and use sales data and statistics relating to each product in a particular market, for example, a pharmacy.

Figure 1:
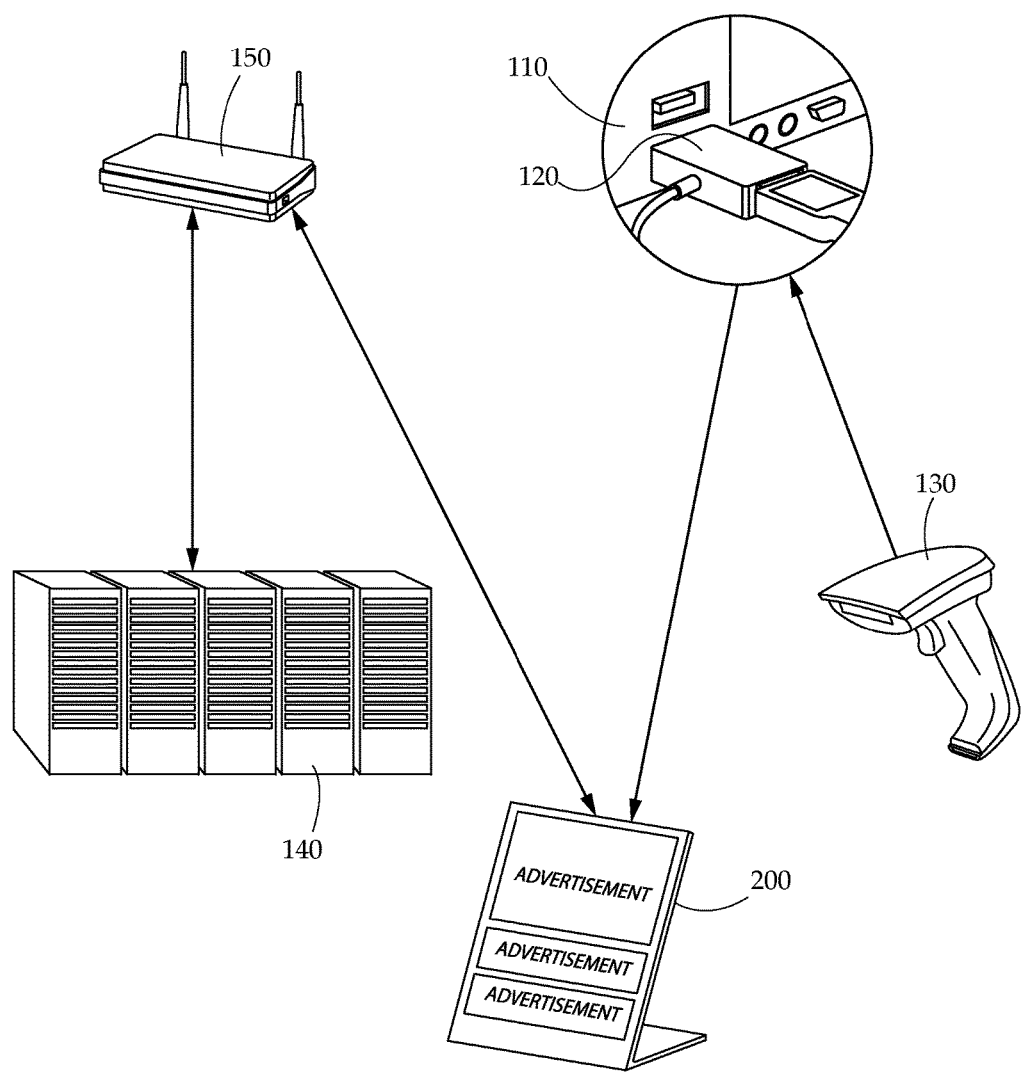
FIG. 1 is a diagram of an architecture of a preferred embodiment of the present invention.

As shown in FIG. 1, a system of a preferred embodiment system has a point-of-sale computer 110 with management software, a USB/PS2 bypass 120 connected to the point-of-sale computer 110, a bar code reader 130 connected through the USB/PS2 bypass 120 to the point-of-sale computer 110, an electronic display 200 connected to the bar code reader 130 through the USB/PS2 bypass 120 and a database 140 of product information connected to the electronic display. The database may be connected, for example, through a wireless router or a LAN 140 and the internet. The USB/PS2 bypass 120 receives input from the bar code reader 130 and splits the input signal into two signals, one is communicated to the point of sale computer 110, and the other is communicated to the electronic display 200. The USB/PS2 bypass 120 may be any structure capable of splitting an input signal into two of the same signals including, but not limited to, a two channel splitter. The database is stored in a storage, hard drive, or memory and is in electronic communication with the electronic display and/or point of sale computer. The database may be stored at a location either locally, or remotely to the point-of-sale. The product information in the database includes, for example, bar code data and data correlating products in the database.

When the bar code reader 130 scans a bar code of a first product, data identifying the first product is passed through the USB/PS2 bypass 120 or other connection bus to the computer 110 and to the electronic display 200. In response to receiving the data identifying the first product, the electronic display 200 retrieves from the database 140, via communication through wireless router 150, information relating to a second product correlated to the first product in the database 140. The electronic display 200 displays the information relating to the second product to the user to encourage purchase by the user. The display 200 being visible to a purchaser.

In another embodiment, the USB/PS2 bypass 120 may be eliminated by providing the display 200 in direct communication with the point of sale computer 110, and connecting the database 140 of product information directly to the point of sale computer 110. In this embodiment, the bar code scanned by the bar code reader 130 is processed by the point of sale computer 110 in communication with the database 140. The point of sale computer 110 retrieves information from the database 140 relating to products correlated to the first product. The point of sale computer 110 then provides a signal to the display 200 to display the information relating to the second product to the user to encourage purchase by the user. The display 200 being visible to a purchaser.

The electronic display 200 may be any computerized display, such as a smart display having a processor and memory or other storage means, or a computer monitor receiving a signal from a computer connected to it. Examples of the electronic display 200 may be a tablet computer such as an iPad®, Kindle® Fire®, Nook® Color, Samsung® Galaxy® Note® or Tab®, and the like, as well as a computer monitor, a laptop, a smart phone, or mobile computing device, among others.

Figure 2:
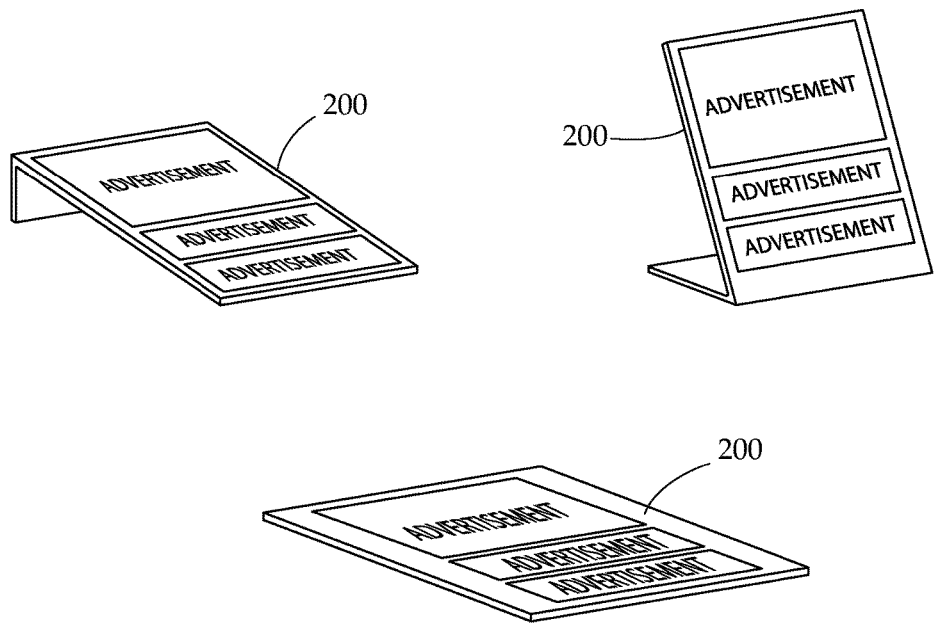
FIG. 2 is a diagram illustrating variations of an electronic display of a system in accordance with a preferred embodiment of the present invention.
Figure 3:
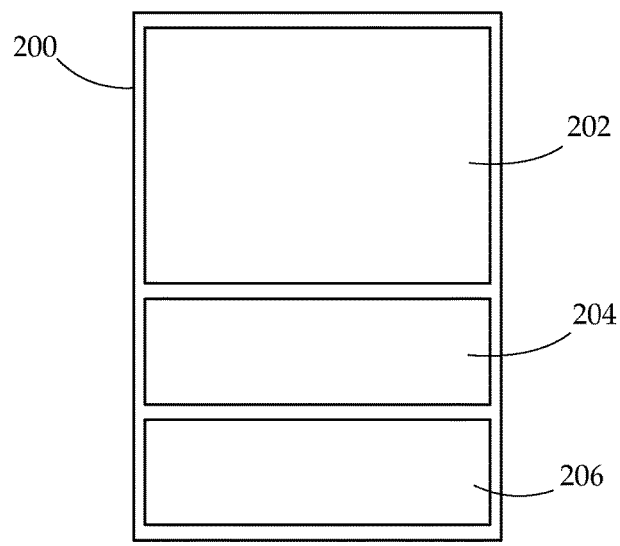
FIG. 3 is a block diagram of a display of a system in accordance with a preferred embodiment of the present invention.
Figures 4, 5:
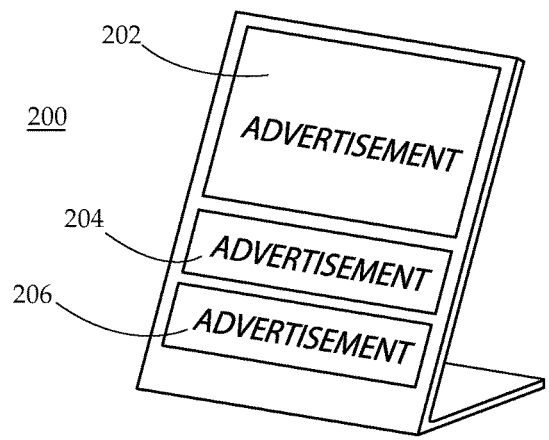
FIG. 4 is a perspective view of a display of a system in accordance with a preferred embodiment of the present invention.
FIG. 5 is a table illustrating various aspects of the present invention.

The display 200, shown in FIGS. 2-4, may be, for example, a 10-inch flat screen tablet display. As shown in FIG. 2, the display may lay flat on a counter, at an angle or perpendicular to a counter, or may be mounted in a vertical manner by conventional means.

The display may be divided, either physically, or more likely, using a software based controller to divide a single screen. The division may be, for example, into a plurality of sections, slots or windows 202, 204 and 206 as shown in FIGS. 3 and 4. One window may display, for example, products that commonly are or may be purchased together with the product being purchased. For example, in the pharmaceutical market when insulin in scanned for purchase, information relating to syringe may be displayed. If an antibiotic is scanned for purchase, a pro-biotic may be shown. Another window may display alternative products, such as similar products from different brands or the same brand in a different format, such as a syrup as an alternative to a pill. In another embodiment, a window or slot may display products that are correlated by family, such as products with similar functions or purpose. For example, information of a hair removal machine being displayed when a hair removal cream is scanned for purchase. Additionally, slots or windows in the display could be used for paid advertising. FIG. 5 is a table illustrating an example of advertising revenue generated by selling advertising time in the various slots or windows on a percentage basis. In the table in FIG. 5, the pricing for each product is influenced by the product (A, B, C, . . . ), the number of stores associated with the service and the number of products.

In another embodiment, the electronic display may display useful or important information relating to a product being purchased. For example, if the product is a drug that cannot be used with other drugs or may cause complications with them, this information may be provided to the electronic display. In another example, product warnings or allergy information may be provided. This information related to the product may be displayed in addition to or instead of an advertisement or information relating to a second product.

The product correlation data in the database may be provided by a producer or distributor of products, by the store operator advertiser, or the like. Further, the correlation data may be developed through analysis of prior sales, either through store gathered data, or from large scale data gathering services and data warehouses. Moreover, the correlations may be entered, for example, by a distributor through a web-based user interface.

When a customer purchases an item, a barcode on the item is scanned. The scanned bar code data is passed from the bar code reader to the point-of-sale computer and to the electronic display through the USB/PS2 bypass. Using the received bar code data, the electronic display, or point of sale computer, or processor in communication with the display retrieves correlation data associated with received bar code data and displays information of other products related to the product being purchased.

Additionally, data relating to sales of additional products through use of the display, i.e., additional items sold with the original item being purchase after information of the additional items has been shown on the display, may be collected and analyzed over time.

In still yet another embodiment, the system may further comprise a user identification source such as a card, barcode, ID number, or the like. In this embodiment, the identification source may be scanned during checkout, either before other items are scanned or after. By scanning the identification source, the database may receive the scanned information and provide output information to the electronic display based on customer's history. This information may include reminders for recent purchases to re-purchase, notifications, suggested products for purchase, targeted advertisement, and the like.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A checkout and point of sale system for presenting information related to an identified product during checkout comprising:
   a point of sale computer;
   a universal serial bus/personal system/2 bypass connected to the point of sale computer configured to split a data output from a bar code reader connected through the universal serial bus/personal system/2 bypass to the point-of-sale computer, the splitting of the data output splitting the data output from the bar code reader into two identical signals, a first of the two identical signals going to the point of sale computer;
   an electronic display comprising a computer processor connected through the universal serial bus/personal system/2 bypass to the bar code reader, a second of the two identical signals from the universal serial bus/ personal system/2 bypass going to the electronic display, the electronic display being isolated from communication with the point of sale computer; and a database in a computerized storage, the database comprising product information, data correlating products in the database and visual representations of product warning information, the database in electronic communication with the electronic display, and isolated from communication with the point of sale computer;

the database accessible by at least one of a producer, distributor, or store operator, wherein the data correlating products in the database is enterable by the at least one of the producer, distributor, or store operator, via a web-based user interface;

wherein, when the bar code reader scans a bar code of a first product, providing the data output identifying the first product, the data identifying the first product is passed through the universal serial bus/personal system/2 bypass and split, sending the first signal to the point of sale computer and the second signal to the electronic display, and in response to receiving the data identifying the first product, the electronic display computer processor operable to retrieve, from the database, information relating to a second product correlated to the first product and operable to cause the electronic display to present the information relating to the second product on the electronic display in a first window portion of the electronic display, so as to dynamically present customized information to a customer based on the first product, allowing customized advertising directed to the customer presented on the electronic display; and wherein the computer processor of the electronic display is operable to cause the electronic display to present product warning information in a second window portion of the electronic display which is visually separated from the first window, so as to dynamically present customized product warning information to the customer based on the first product, allowing customized information to be directed to the customer presented on the electronic display;

the checkout and point of sale system being operable without a modification of the point of sale computer by the isolation of the electronic display and the database from the point of sale computer, thereby allowing the checkout and point of sale system to be operable on an existing point of sale computer without modification of the existing point of sale computer.

2. The system for presenting information related to an identified product of claim 1 wherein the electronic display is configured to display an advertisement in addition to the information relating to the second product.

3. The system for presenting information related to an identified product of claim 1 wherein the electronic display is in wireless communication with the database.

4. The system for presenting information related to an identified product of claim 1 wherein the electronic display is configured to retrieve information relating to a third product correlated to the first product from the database, and configured to display the information relating to the third product.

5. The system for presenting information related to an identified product of claim 1 wherein the electronic display is configured to display information relating to the first product in addition to the information relating to the second product.

6. The system for presenting information related to an identified product of claim 1 further comprising an identification source, the identification source being scannable by the bar code reader, which provides an output regarding the scanned identification source; and wherein the output regarding the scanned identification source is passed through the universal serial bus/personal system/2 bypass to the electronic display, and in response to receiving the output, the electronic display retrieves from the database information relating to a history of the identification source.

7. The system for presenting information related to an identified product of claim 1 wherein the information relating to the second product is information relating to a product frequently purchased with the first product;

wherein the electronic display further retrieves, from the database, information relating to a third product, the third product being an alternative to the first product, the electronic display configured to display the information relating to the third product.

8. The system for presenting information related to an identified product of claim 1 wherein the information relating to the second product is information relating to a product frequently purchased with the first product;

wherein the electronic display further retrieves, from the database, information relating to a third product, the third product being a product with a similar function as the first product, the electronic display configured to display the information relating to the third product.

* * * * *